J. T. FREEMAN.
POULTRY FEEDER.
APPLICATION FILED OCT. 13, 1910.
997,248.
Patented July 4, 1911.
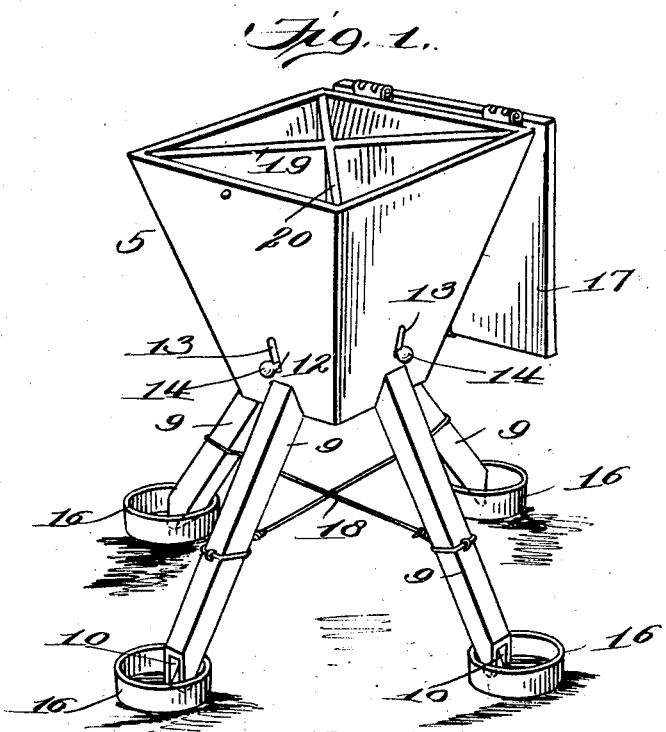
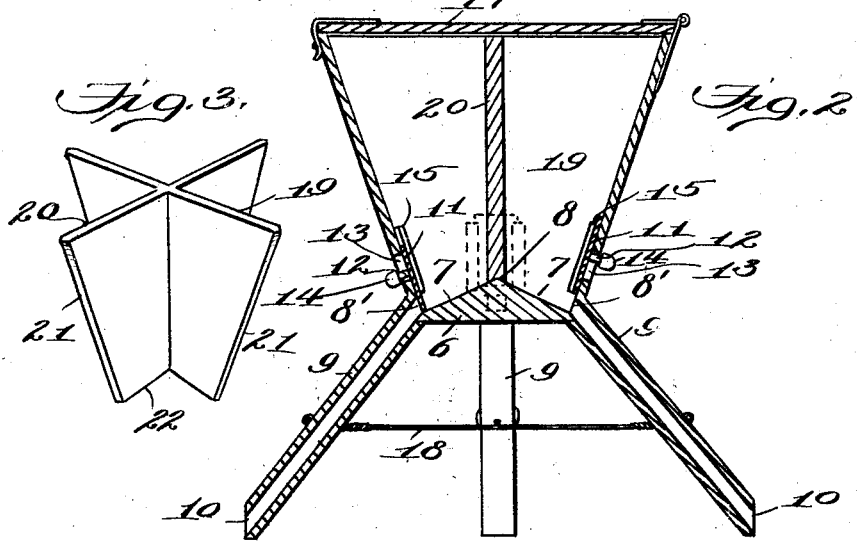

UNITED STATES PATENT OFFICE.

JESSE T. FREEMAN, OF LOUISVILLE, ILLINOIS.

POULTRY-FEEDER.

997,248.　　　　　　Specification of Letters Patent.　　　Patented July 4, 1911.

Application filed October 13, 1910. Serial No. 586,920.

*To all whom it may concern:*

Be it known that I, JESSE T. FREEMAN, a citizen of the United States, residing at Louisville, in the county of Clay and State of Illinois, have invented new and useful Improvements in Poultry-Feeders, of which the following is a specification.

This invention relates to poultry feeders, and the primary object of the same is to provide a device of this class having a plurality of tubular means constituting supports for the body and permitting the feeding material either of the same or different kinds to be automatically dispensed within easy reaching distance of poultry and especially the young of the latter without requiring any attention after a desired arrangement of the feed controlling means and permitting access to the feed at any time.

With this and other objects and advantages in view the invention consists in the construction and arrangement of the several parts which will be more fully hereinafter described and claimed.

In the drawing: Figure 1 is a perspective view of a poultry feeder embodying the features of the invention and showing the lid or cover in open position. Fig. 2 is a transverse vertical section of the same. Fig. 3 is a detail perspective view of a divider or partition for the body of the feeder.

The numeral 5 designates the body of the feeder which is preferably of hopper-shape or of inverted truncated quadrangular form, though it may be of other contour so long as it converges toward its lower extremity. In the form of the body 5 shown, a bottom 6 is provided, see Fig. 2, having its upper surface sloping downwardly as at 7 in opposite directions from an apex 8, there being in the present instance four downwardly sloping surfaces 7 trending toward outlet openings 8' disposed in the centers of the lower ends of the sides of the body and over which are secured the upper ends of tubular legs 9 vertically cut off as at 10 at their lower ends to facilitate the outflow of the feeding material therefrom. Coöperating with each outlet opening 8' is a vertically movable slide valve or cut-off 11 applied against the adjacent inner side of the body 5 and having an operating stem 12 projecting through a slot 13 in said side, the stem terminating in an exterior knob or grip 14 for opening and closing the slide or cut-off valve 11. Each of the slides or cut-off valves 11 is mounted in suitable guides 15 and has sufficient frictional bearing with relation to said guides to insure a retention of each slide or cut-off valve in its adjusted position, particularly when raised to open the outlet opening 8' with which it coöperates. It is preferred, also, that the lower extremities of the tubular legs, or combined legs and feed chutes 9, be disposed in feed cups 16, as clearly shown by Fig. 1, so that the feeding material passing out of the lower ends of said combined legs and feed chutes may be disposed in convenient position in the cups for access by the poultry. The body 5 also has a suitably hinged cover 17, and to strengthen the combined legs and feed chutes 9 wire or analogous braces 18 are secured thereto at such elevation above the lower ends of the legs as to avoid interference with the free passage of the poultry under and between the legs. The poultry feeder thus far described may be readily used for effectively supplying feeding material of one kind at four different points and within easy reach of the poultry, but to render the device more advantageous in its operation it is supplied with a divider or angular partition means, as shown in detail by Fig. 3, and consisting of flat members 19 and 20 centrally intersecting each other in planes at right angles and snugly fitting within the body 5 to divide the latter into four compartments, one for each leg or chute 9, and permit the introduction in a single feeder of four kinds of feed, if desired, or the same kind of feed alternately in each compartment. The outer edges 21 of the members 19 and 20 are angular in shape to closely fit in the corners of the body 5, as shown by Fig. 1, and the lower reduced extremities of the members as at 22 are cut at an upward angle of inclination toward the center or intersecting points of the members to snugly fit over and conform to the contour of the bottom 6 so that the division or partition walls of the several compartments may be tight and prevent material in one compartment from passing through any cracks into an adjacent compartment.

The improved feeder has been specially devised for young poultry, such as chicks and turkeys, requiring to be frequently fed and to have different kinds of feed supplied to them. In ordinary hand feeding, an attendant is required to carefully and regularly feed young chickens and turkeys with great inconvenience. By means of the improved feeder young poultry may be fed without requiring special and inconvenient work of an attendant and at all hours of the day, the automatic supply of the feed being maintained as long as there is any feed remaining in the body of the feeder. It is proposed to make the improved feeder in various sizes and to modify the general proportions as may be desired. Furthermore, the device is not limited in its use to the number of combined legs and chutes or compartments used with and formed in the body.

What is claimed as new is:

1. In a poultry feeder, a quadrangular body having sides converging toward and intersecting a quadrangular pyramidal bottom, a plurality of tubular supporting legs connected to the lower end of the body at the point of intersection of the sides with the said bottom, the legs extending outwardly and downwardly at angles of inclination from each side of the body and all of the legs having free outlet openings at their lower ends, the legs being also longitudinally straight, a divider consisting of angularly intersecting partitions inserted in and conforming to the shape of the body and having its lower end recessed to snugly fit over the apex of the body bottom, and cut-off means in the lower portions of the sides of the body adjacent to the points of intersection of the legs with the body.

2. In a poultry feeder, a quadrangular body having sides converging and intersecting a quadrangular pyramidal bottom, a plurality of tubular supporting legs connected to the lower end of the body at the point of intersection of the sides with the said bottom, a leg projecting from each side of the body and all of the legs having free outlet openings at their lower ends, and cut-off means in the lower portions of the sides of the body adjacent to the points of intersection of the legs with the latter.

3. In a poultry feeder, a quadrangular body having sides converging toward a quadrangular pyramidal bottom, a plurality of tubular supporting legs connected to the lower end of the body at the point of intersection of the sides with said bottom, a leg projecting from the point of intersection of each side of the body and bottom of the latter and all of the legs having free outlet openings at their lower ends, cut-off means in the lower portions of the sides of the body adjacent to the points of intersection of the legs with the latter, and open receptacles in which the lower ends of the legs are disposed.

In testimony whereof I have hereunto set my hand in presence of two subscribing witnesses.

JESSE T. FREEMAN.

Witnesses:
MARION MASON,
CHARLES E. MAXWELL.

---

Copies of this patent may be obtained for five cents each, by addressing the "Commissioner of Patents, Washington, D. C."